United States Patent
Merkin et al.

(10) Patent No.: US 11,594,959 B1
(45) Date of Patent: Feb. 28, 2023

(54) SWITCHED CAPACITOR CIRCUIT WITH PASSIVE CHARGE RECYCLING

(71) Applicant: Texas Instruments Incorporated, Dallas, TX (US)

(72) Inventors: Timothy Bryan Merkin, Princeton, TX (US); John Russell Broze, Dallas, TX (US); Orlando Lazaro, Cary, NC (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/515,387

(22) Filed: Oct. 29, 2021

(51) Int. Cl.
*H02M 3/07* (2006.01)

(52) U.S. Cl.
CPC .................................. *H02M 3/073* (2013.01)

(58) Field of Classification Search
None
See application file for complete search history.

(56) References Cited

U.S. PATENT DOCUMENTS

| | | | | |
|---|---|---|---|---|
| 4,199,805 A * | 4/1980 | Martinelli | ............. | H02M 7/103 363/60 |
| 5,936,459 A * | 8/1999 | Hamamoto | ............. | H02M 3/07 327/536 |
| 6,469,571 B2 * | 10/2002 | Esterl | ................... | H02M 3/073 327/536 |
| 6,717,459 B2 * | 4/2004 | Blodgett | ............... | H02M 3/073 363/59 |
| 8,598,854 B2 * | 12/2013 | Soenen | ................... | G05F 1/575 363/59 |
| 9,219,427 B2 * | 12/2015 | Aebischer | ............... | H02M 1/32 |
| 9,502,972 B1 * | 11/2016 | Michal | ..................... | H02M 1/38 |
| 9,564,794 B2 * | 2/2017 | Ku | .......................... | H02M 1/14 |
| 10,972,004 B2 * | 4/2021 | Lenhard | ................ | H02M 3/073 |
| 2009/0261891 A1 * | 10/2009 | Yeh | .......................... | H02M 3/07 327/536 |
| 2011/0068857 A1 * | 3/2011 | Ucciardello | .......... | H02M 3/073 327/536 |

OTHER PUBLICATIONS

'Voltage doubler', Wikipedia, available at https://en.wikipedia.org/w/index.php?title=Voltage_doubler&oldid=103924832 on Aug. 17, 2021, pp. 1-7.
"Voltage multiplier", Wikipedia, available at https://en.wikipedia.org/w/indes.php?title=Voltage_multiplier&oldid=1037730519 on Aug. 8, 2021, pp. 1-8.

* cited by examiner

*Primary Examiner* — Thomas J. Hiltunen
(74) *Attorney, Agent, or Firm* — Frank D. Cimino

(57) ABSTRACT

A switched capacitor voltage multiplication device has a rectifier with a DC input terminal and a DC output terminal and two pulse input terminals. A first flying capacitor is coupled to one of the pulse input terminals, while a second flying capacitor is coupled to the other pulse input terminal. A recycle resistor is coupled across the rectifier with a first resistor terminal coupled to one pulse input terminal and a second resistor terminal coupled to the other pulse input terminal.

20 Claims, 10 Drawing Sheets

SWITCHED CAPACITOR CIRCUIT WITH PASSIVE CHARGE RECYCLING

TECHNICAL FIELD

This relates to a switched capacitor voltage converter that has a charge recycling element.

BACKGROUND

Switched capacitor circuits are often used to translate one voltage source into another. It is often referred to as a "charge pump," or a "voltage multiplier," and the new voltage source can be at different voltage levels and referenced to difference potentials in the system. To achieve a high enough desired voltage, multiple charge pump stages may be used. This results in more silicon area.

SUMMARY

In described examples, a switched capacitor voltage multiplication device has a bridge rectifier with a DC input terminal and a DC output terminal and two pulse input terminals. A first flying capacitor is coupled to one of the rectifier pulse input terminals, while a second flying capacitor is coupled to the other rectifier pulse input terminal. A recycle element is coupled across the bridge rectifier with a first recycle element terminal coupled to one pulse input terminal and a second recycle element terminal coupled to the other pulse input terminal.

DETAILED DESCRIPTION

Figure 1A:
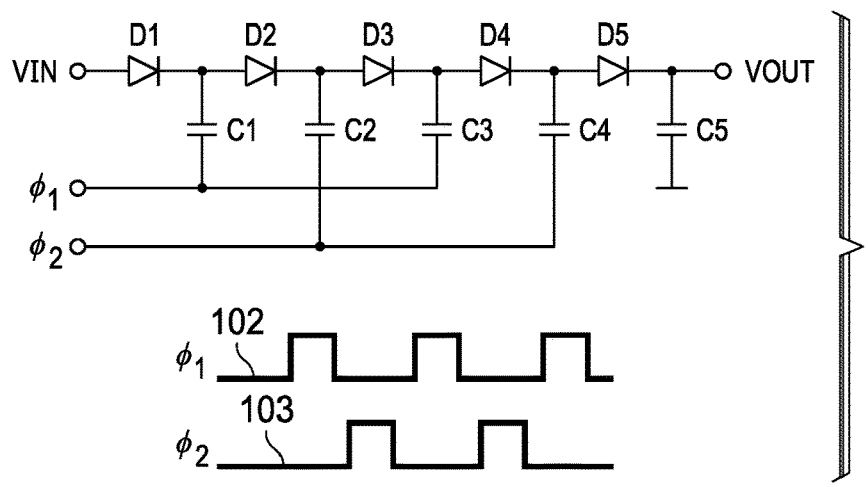
FIG. 1A-1E are schematics of conventional switched capacitor voltage multiplier circuits.

In the drawings, like elements are denoted by like reference numerals for consistency.

Switched capacitor circuits are often used to translate one voltage source into another. It is often referred to as a "charge pump" or a "voltage multiplier," and the new voltage source can be at different voltage levels and referenced to difference potentials in the system. Typically, to achieve a high enough desired voltage, multiple charge pump stages are be used. However, this requires additional silicon area for the multiple stages. The general operation of voltage multipliers is known, see, for example: "Voltage Multiplier," Wikipedia, Aug. 8, 2021, or later.

A passive method of charge recycling described herein provides up to a factor of two voltage multiplication using only a single recycle resistor. This saves area and cost over simply adding an additional stage to a typical charge pump. This technique simply adds a single recycle resistor and no additional active circuitry in place of extra drivers, capacitors, etc. In another example, a switch with appropriate control logic may be used as a recycle element.

Figure 1B:
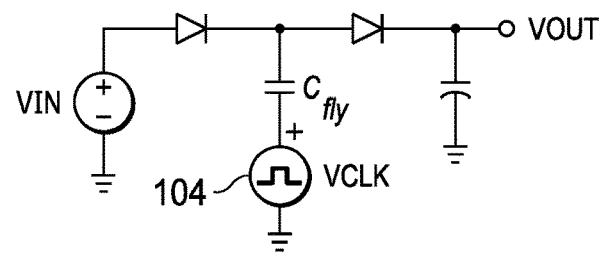

FIG. 1A is a schematic of a conventional switched capacitor voltage multiplication circuit. This example illustrates a "Dickson charge pump," or "Dickson multiplier," that includes a cascade of diode/capacitor cells with the bottom plate of each capacitor driven by clock pulse trains, illustrated by plots 102, 103. The circuit is a modification of the Cockcroft-Walton multiplier but takes a DC input with the clock trains providing the switching signal instead of an AC input. The Dickson multiplier normally requires that alternate cells are driven from clock pulses of opposite phase. However, a voltage doubler can be implemented with only one stage of multiplication in which only one clock signal 104 is required, as illustrated in FIG. 1B.

In the popular complementary metal oxide semiconductor (CMOS) integrated circuits (ICs) technology, the transistor which forms the basic building block of circuits is the MOS field effect transistor (MOSFET), such as a p-type MOS (PMOS) transistor and an n-type MOS (NMOS) transistor. Consequently, the diodes in the Dickson multiplier are often replaced with MOSFETs wired to behave as diodes.

Referring to FIG. 1A, when the clock Φ1 is low, D1 will charge C1 to Vin. When Φ1 102 goes high the top plate of C1 is pushed up to 2 Vin. This causes D1 to "switch" off and causes D2 to "switch" on and C2 begins to charge to 2 Vin. On the next clock cycle, Φ1 again goes low and now Φ2 103 goes high pushing the top plate of C2 to 3 Vin. D2 switches off and D3 switches on, charging C3 to 3 Vin and so on with charge passing up the chain, hence the name charge pump. The final diode-capacitor cell D5, C5 in the cascade is connected to ground rather than a clock phase and hence is not a multiplier; it is a peak detector/filter which provides smoothing of output voltage Vout.

Figure 1C:
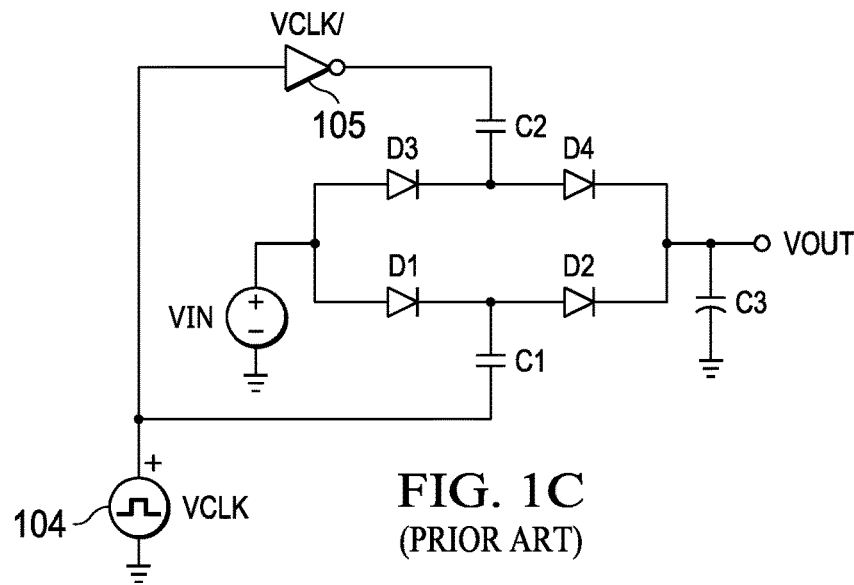

FIG. 1C is a schematic of another conventional switched capacitor voltage multiplier circuit. In this example, diode-capacitor cell D1, C1, D2 is connected in parallel with diode-capacitor cell D3, C2, D4. One plate of capacitor C1 is connected to a clock pulse train signal Vclk provided by clock circuit 104. Inverter 105 provides an inverted pulse train signal Vclk/ that is connected to one plate of capacitor C2. This parallel configuration is essentially two back-to-back multipliers similar to FIG. 1B and can provide more current than the multiplier of FIG. 1B using similar sized capacitors and diodes.

Figure 1D:
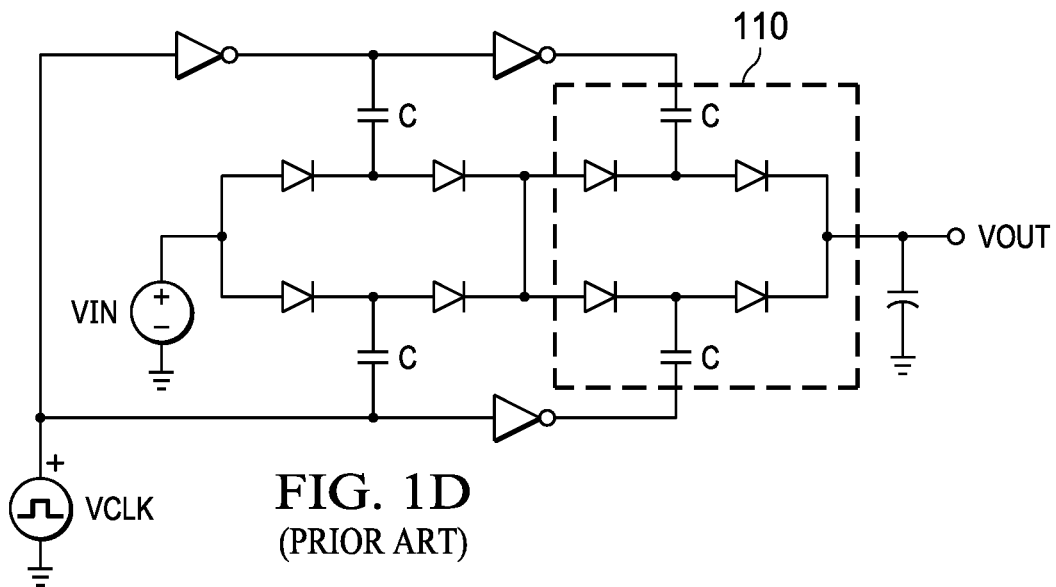

FIG. 1D is schematic of another conventional switched capacitor voltage multiplier circuit. This circuit adds a second stage 110 to the circuit of FIG. 1C and thereby can produce a higher voltage than the circuit of FIG. 1C. The operation of this circuit is similar to the operation of the circuit of FIG. 1A.

Figure 1E:
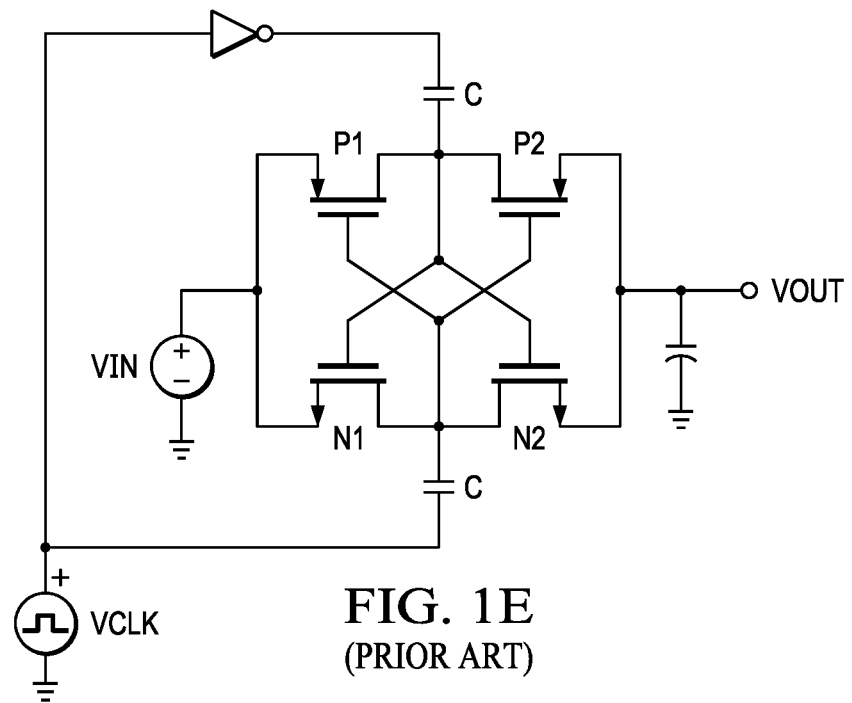

FIG. 1E is schematic of another conventional switched capacitor voltage multiplier circuit. A voltage multiplier may be formed with a cascade of voltage doublers of the cross-coupled switched capacitor type. This type of circuit is typically used instead of a Dickson multiplier when the source voltage is 1.2 V or less. Dickson multipliers have increasingly poor power conversion efficiency as the input voltage drops because the voltage drop across the diode-wired transistors becomes much more significant compared to the output voltage. In this example, PMOS transistors P1, P2 and NMOS transistors N1, N2 are cross-coupled and operate in a linear region. Since the transistors in the cross-coupled circuit are not diode-wired the volt-drop problem is not so serious.

Figure 2:
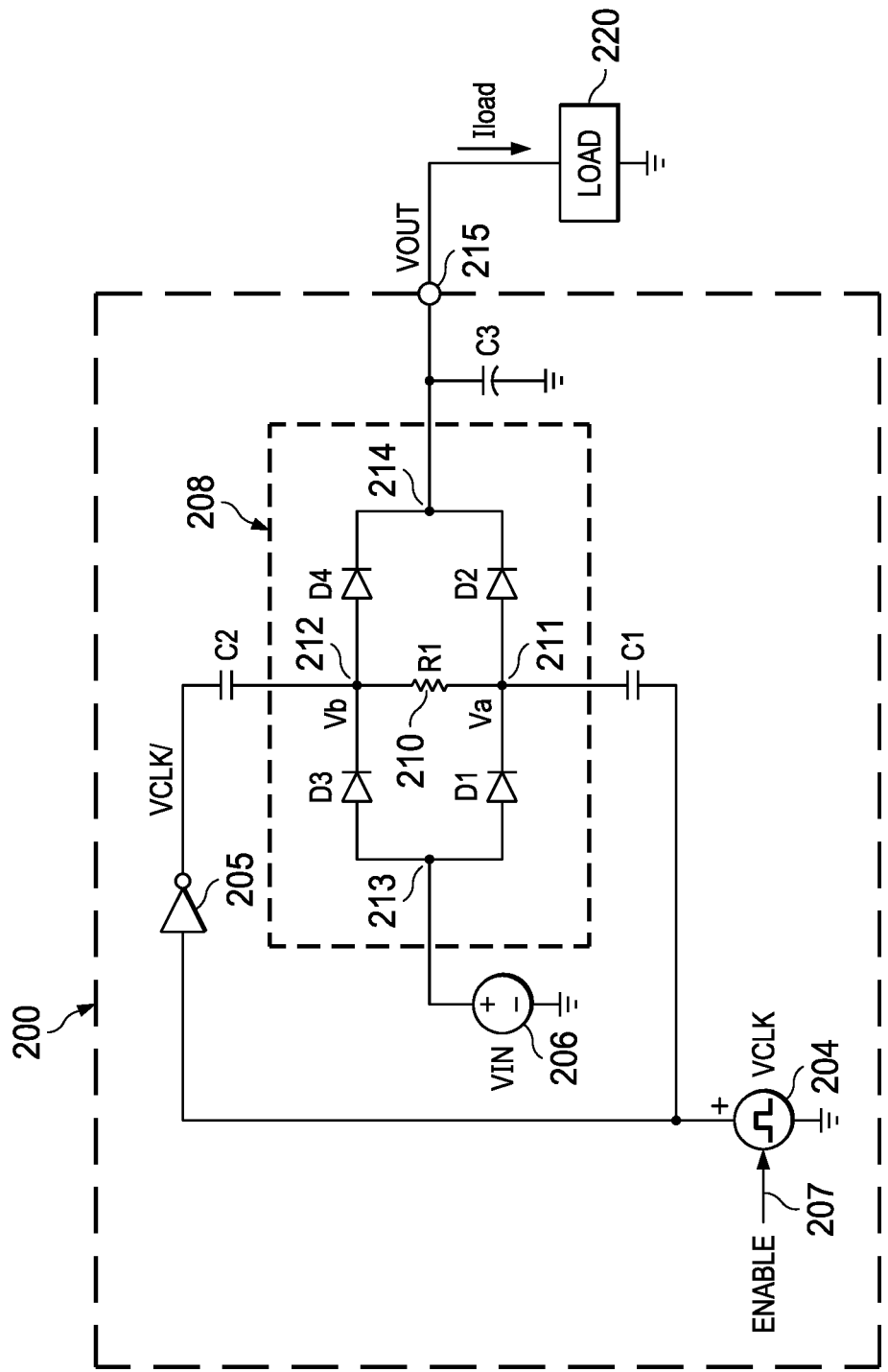
FIG. 2 is a schematic of an example switched capacitor circuit that has passive charge recycling.

FIG. 2 is a schematic of an example switched capacitor charge pump circuit 200 that has passive charge recycling provided by recycle element 210. In this example, charge pump circuit 200 is similar to the multiplier circuit of FIG. 1C, with the addition of recycle element 210.

Diode elements D1, D2, D3, D4 are connected as a bridge rectifier 208. A diode bridge is an arrangement of diodes that provides the same polarity of output for either polarity of input on its pulse terminals. Pulse train signal Vclk from pulse generator 204 is coupled to one plate of capacitor C1, while the other plate of capacitor C1 is coupled to pulse terminal 211 of rectifier 208 on which a voltage Va is produced. Similarly, inverted pulse train signal Vclk/ from inverter 205 is coupled to one plate of capacitor C2, while the other plate of capacitor C2 is coupled to pulse terminal 212 of rectifier 208 on which a voltage Vb is produced. Terminal 214 of rectifier 208 produces output signal Vout which is filtered by filter capacitor C3. Input voltage Vin is provided by voltage source 206 to DC (direct current) input terminal 213 of rectifier 208.

In this example, an enable signal 207 is coupled to pulse generator 204 that can be used to selectively turn the pulse generator on or off in order to control the operation of charge pump 200.

Figure 3:
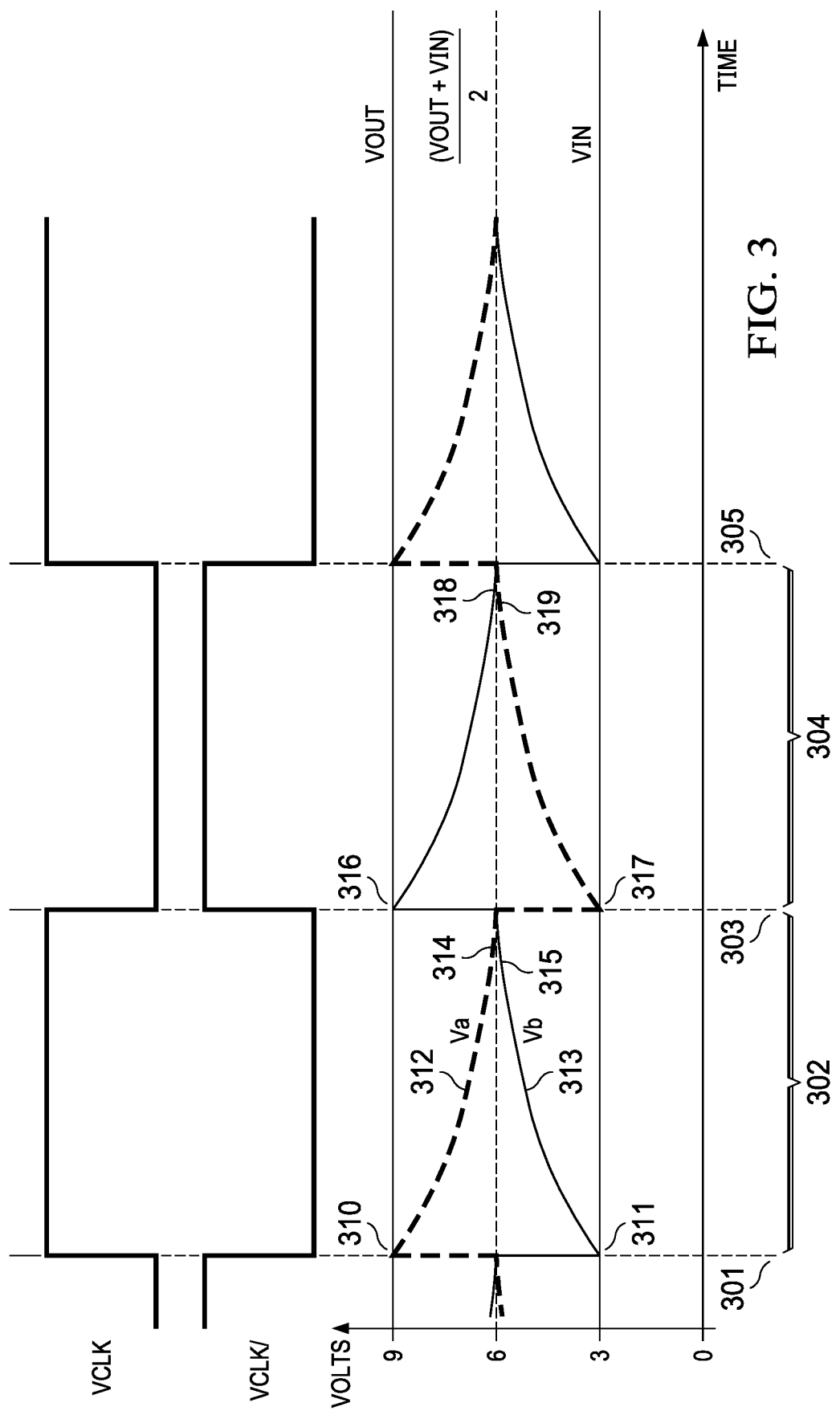
FIG. 3 is a set of plots illustrating operation of the example switched capacitor circuit of FIG. 2.

FIG. 3 is a set of plots illustrating operation of the example switched capacitor circuit 200 of FIG. 2. In this example, it is assumed diodes D1, D2, D3, D4 are "ideal" diodes, meaning their forward voltage drop is approximately zero. It is also assumed the voltage amplitude of the Vclk signal provided by pulse generator 204 and the voltage amplitude of the Vclk/ signal provided by inverter 205 is approximately the same as the magnitude of Vin provided by voltage source 206. In this example, Vin, Vclk, and Vclk/ are assumed to each have a voltage magnitude of approximately 3V. In another example, results will be different depending on an actual diode voltage drop and the relative magnitudes of Vin, Vclk, and Vclk/. Signal Vclk/ is antiphase to signal Vclk. In this example, pulsed signal Vclk has a symmetrical high and low waveform. In another example, signal Vclk may have a non-symmetrical waveform, such as having a longer low portion than the high portion, or vice versa.

In operation without the use of recycle resistor R1, when the Vclk signal is low, D1 will initially charge C1 to Vin and signal Va on terminal 211 will have a value of approximately Vin (three volts in this example). When Vclk goes high, the top plate of C1 is "boosted" up and provides a voltage charge to pulse terminal 211 and signal Va will then have a value of approximately 2 Vin (six volts in this example). This causes D1 to switch off and causes D2 to switch on and filter capacitor C3 begins to charge to 2 Vin. Similarly, when the Vclk/ signal is low, D3 will charge C2 to Vin and signal Vb on terminal 212 will have a value of approximately Vin (three volts in this example). When Vclk/ goes high, the top plate of C2 is boosted up and provides a voltage charge to terminal 212 and signal Vb will then have a value of approximately 2 Vin (six volts in this example). This causes D3 to switch off and causes D4 to switch on to provide 2 Vin to filter capacitor C3. Capacitors C1 and C2 are referred to as "flying capacitors" because the potential across them moves up and down in response to the pulse signal connected to them.

In this example, recycle resistor R1 allows charge to be transferred between terminals 211, 212 during the stationary periods of clock pulses Vclk and Vclk/. Thus, when signal Vclk goes high at time 301, signal Va on terminal 211 is boosted by an amount approximately equal to the magnitude of Vclk (3V in this example) as indicated at 310 while signal Vb on terminal 212 is dropped by an amount approximately equal to the magnitude of Vclk/ as indicated at 311. During a duration of stationary clock state indicated at 302, the boosted charge on terminal 211 is recycled via recycle element 210 to terminal 212. This causes signal Va to drop to a value indicated at 314, while signal Vb rises to the value indicated at 315. In this example, recycle element 210 is a resistor. A resistance value for resistor 210 is selected to be small enough so that a time constant formed by the resistance of resistor 210 and the capacitance of capacitor C1 (and similarly capacitor C2) is short enough to allow voltage Va and Vb to settle to approximately a same value by time 303, as indicated by discharge curve 312 and charge curve 313. In this example, the edge rate of Vclk and Vclk/ are fast compared to the stationary state time indicated at 302 to provide sufficient time for charge recycling.

This sequence is repeated in the next stationary clock state indicated at 304. When signal Vclk/ goes high at time 303, signal Vb on terminal 212 is boosted by an amount approximately equal to the magnitude of Vclk (3V in this example) as indicated at 316 while signal Va on terminal 211 is dropped by an amount approximately equal to the magnitude of Vclk/ as indicated at 317. During the duration of stationary clock state indicated at 304, the boosted charge on terminal 211 is recycled via recycle element 210 to terminal 212. This causes signal Vb to drop to a value indicated at 318, while signal Va rises to the value indicated at 319, which is approximately a same value as signal Vb indicated at 318.

This process of charge recycling across rectifier 208 continues and a steady state is attained in which terminal 211, and similarly terminal 212, have an average voltage level as indicated by expression (1). Vout can then be represented by expression (2). Solving for Vout yields expression (3).

$$\bar{V}_a = \bar{V}_b = \frac{(V_{OUT} + V_{IN})}{2} \tag{1}$$

$$V_{OUT} = V_{CLK} + \frac{(V_{OUT} + V_{IN})}{2} \tag{2}$$

$$V_{OUT} = V_{IN} + 2V_{CLK} \tag{3}$$

In this example, Vin is approximately 3V and the magnitude of both Vclk and Vclk/ is approximately 3V. According to expression (1), voltage Va and Vb settle to a steady state value of approximately 6V while Vout is approximately 9V. For comparison, the circuit of FIG. 1C produces a Vout of approximately 6V under the same assumptions, according to expression (4).

$$V_{OUT} = V_{IN} + V_{CLK} \tag{4}$$

In this example, recycle element 210 is a resistor (R1) implemented with polysilicon. In another example, recycle element 210 may be implemented using known or later developed techniques for implementing resistive elements, such as a diffused region, a biased MOSFET device, a low conductive metallic element, etc. In some examples, the recycle element may be an active switch implemented as a switched MOSFET device, or other known or later developed switch technique. In this case, control circuitry is provided to control switching of the recycle element such that it is turned on to allow recycle of charge between terminals 211, 212 and then switched off to allow boosting of the voltage signal on terminals 211, 212.

The resistance of recycle element 210 should be set so that the flying capacitors C1, C2 settle within half a cycle of the pulse signal Vclk. Expression (5) provides a rough estimate for a resistance value for recycle element 210, where R is the resistance value, TCLK is the period of the clock used to generate the drive pulses, and C is the capacitance of each flying capacitor.

$$R = TCLK/(3*C) \qquad (5)$$

In this example, three time-constants are chosen as represented by the factor of 3 in expression (5), which corresponds to approximately 95% settled, which is close enough for good recycle operation.

A design methodology for an example switched capacitor charge pump with passive charge recycling, such as circuit 200, is as follows. For a given load 220, select an acceptable amount of voltage droop, ΔVOUT, for output terminal 215. Size C1, C2 and TCLK to handle the load current, ILOAD, using expression (6). Choose an approximate recycle resistor value according to expression (5) or expression (7).

$$C/TCLK = ILOAD/\Delta VOUT \qquad (6)$$

$$R = \Delta VOUT/(3*ILOAD) \qquad (7)$$

In an example, a recycle resistor value of 200 kohm is selected. A load current in the range of several μA is provided, with output voltages in the range of 3-15V. In other examples, higher currents and output voltage may be produced with different component value selections.

Figure 4:
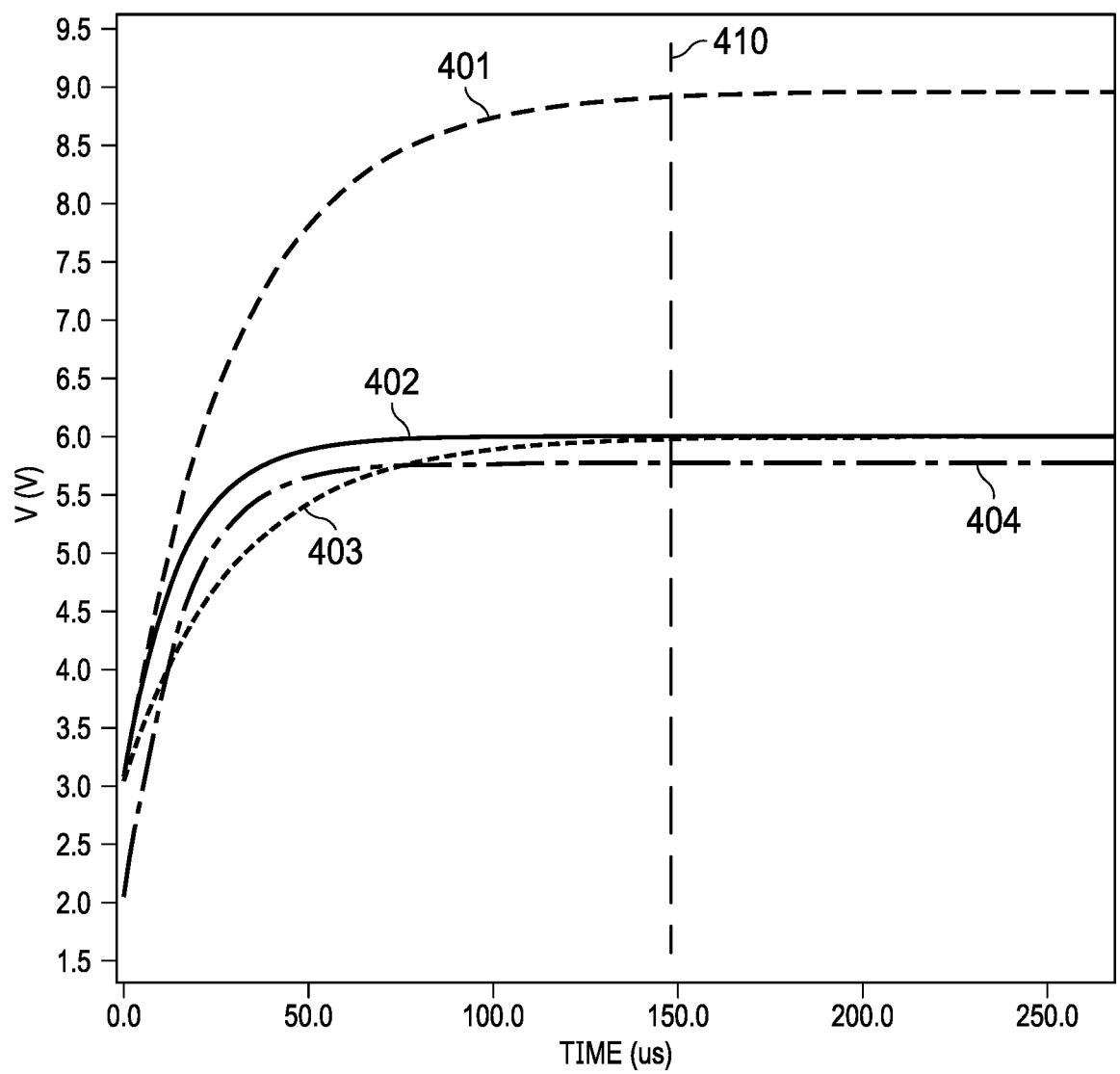
FIG. 4 is a set of plots illustrating simulated operation of the example switched capacitor circuit of FIG. 2.

FIG. 4 is a set of plots illustrating simulated operation of the example switched capacitor circuit of FIG. 2 that provides charge recycling compared to other switched capacitor circuits that do not provide charge recycling. These plots illustrate output voltage in volts versus time in microseconds. These plots assume ideal diodes, an input voltage of 3V, and a pulse magnitude of 3V.

In this example, plot 401 illustrates output voltage provided on output terminal 215 of switched capacitor circuit 200 (FIG. 2). Plot line 402 illustrates output voltage provided by the charge pump of FIG. 1C. Plot line 403 illustrates output voltage provided by the charge pump circuit of FIG. 1B. Plot line 404 illustrates output voltage provided by the charge pump circuit of FIG. 1E.

After about 150 μs of operation as indicated by marker 410, circuit 200 has reached a steady state of operation with an output voltage of approximately 9V, which agrees with expression (3). Plot lines 402, 403, 404 all indicated a steady state output of approximately 6V for their respective charge pump circuits, which agrees with expression (4).

As can be seen by these plots, a significantly higher voltage can be provided by a charge pump circuit that provides charge recycling via a simple resistor as compared to charge pump circuits that do not provide charge recycling.

Multiple Stages

As mentioned hereinabove, multiple charge pump stages may be used to achieve a higher output voltage than can be provided by a single stage charge pump.

Figure 5C:
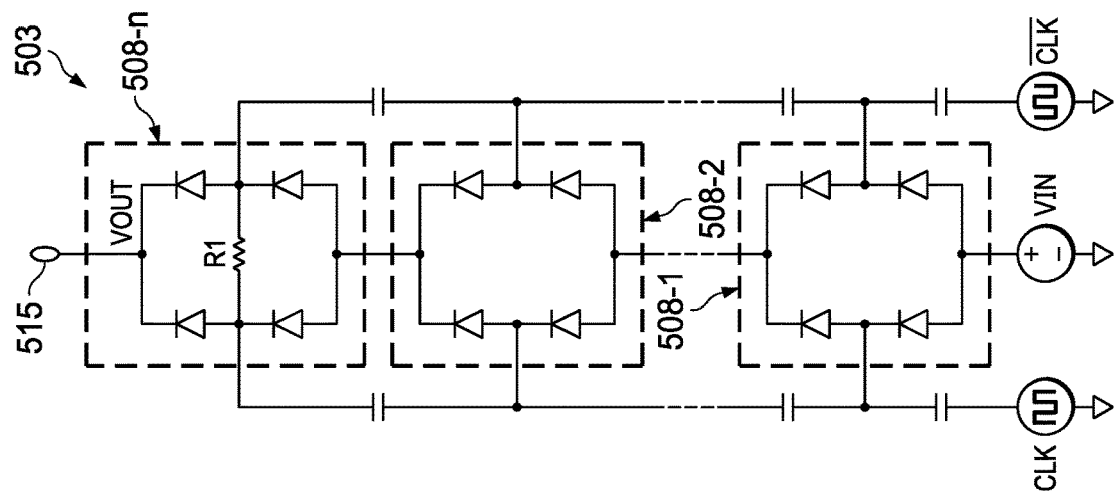
FIGS. 5A, 5B, 5C are schematics of example multi-stage full-wave series multiplier circuits that include charge recycling.
Figure 5B:
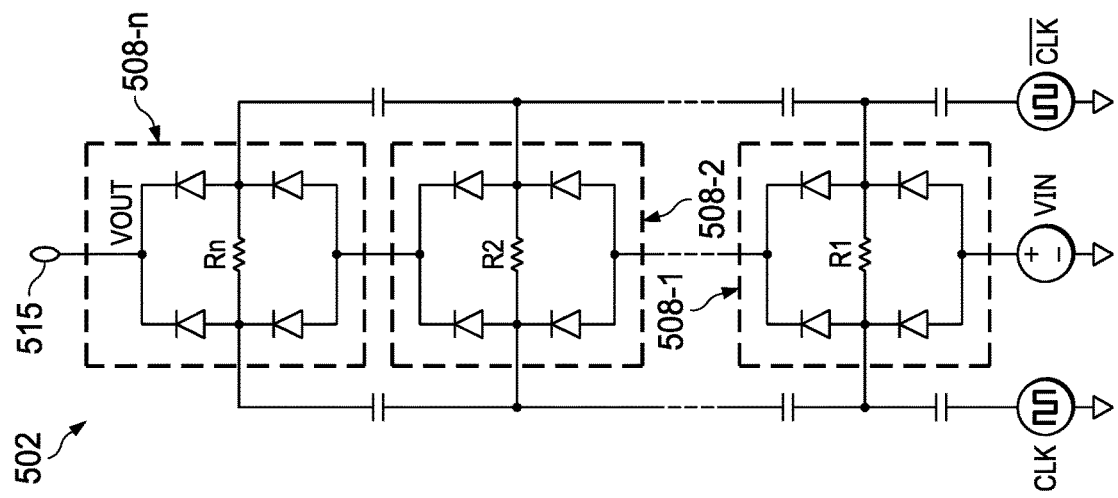
Figure 5A:
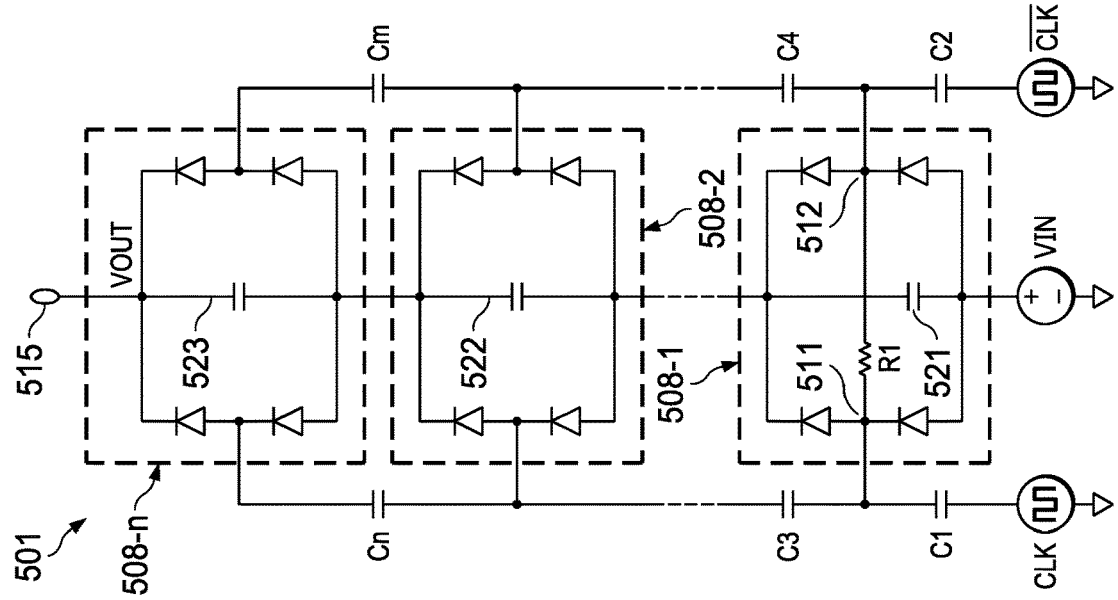

FIGS. 5A, 5B, 5C are schematics of example multi-stage full-wave series multiplier circuits 501, 502, 503 that include charge recycling. FIG. 5A illustrates three or more stages with rectifiers 508-1, 508-2, 508-n. Flying capacitors C1, C3, Cn are connected in series. Likewise, flying capacitors C2, C4, Cm are connected in series. In this example, optional filter capacitors 521, 522, 523 are coupled across the input and output terminals of the respective rectifiers.

In this example, charge recycle resistor R1 is coupled across rectifier 508-1 to the pulse terminals 511, 512. The approximate output voltage Vout on output terminal 515 if a recycle resistor is not included is given by expression (8), where n is the number of stages and Vclk is the magnitude of the pulse signal CLK and CLK/. The approximate output voltage Vout on output terminal 515 when recycle resistor R1 is included is given by expression (9), assuming ideal diodes in the rectifiers.

$$V_{OUT} = V_{IN} + nV_{CLK} \qquad (8)$$

$$V_{OUT} = V_{IN} + 2nV_{CLK} \qquad (9)$$

In the example circuit 502 of FIG. 5B, which is similar to circuit 501 of FIG. 5A, recycle resistors R1, R2, Rn are coupled across each respective rectifier 508-1, 508-2, 508-n. However, the approximate output voltage Vout on output terminal 515 of circuit 502 is still approximately provided by expression (9).

In the example circuit 503 of FIG. 5C, which is similar to circuit 501 of FIG. 5A, recycle resistor R1 is coupled across only the last stage rectifier 508-n of circuit 503. However, in this configuration, the output voltage on terminal 515 is less than indicated by expression (9) but higher than indicated by expression (8).

Figure 6C:
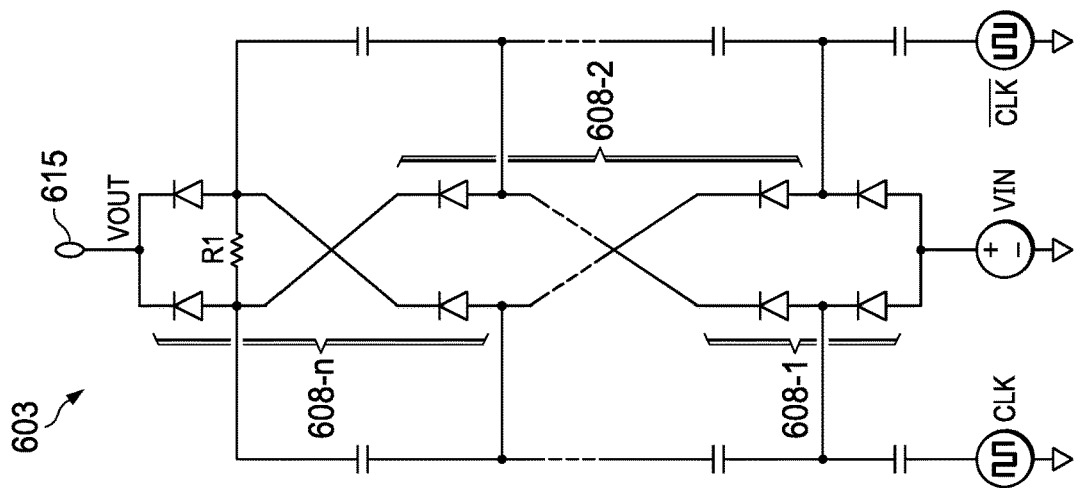
FIGS. 6A, 6B, 6C are schematics of example multi-stage half-wave interleaved series multiplier circuits that include charge recycling.
Figure 6B:
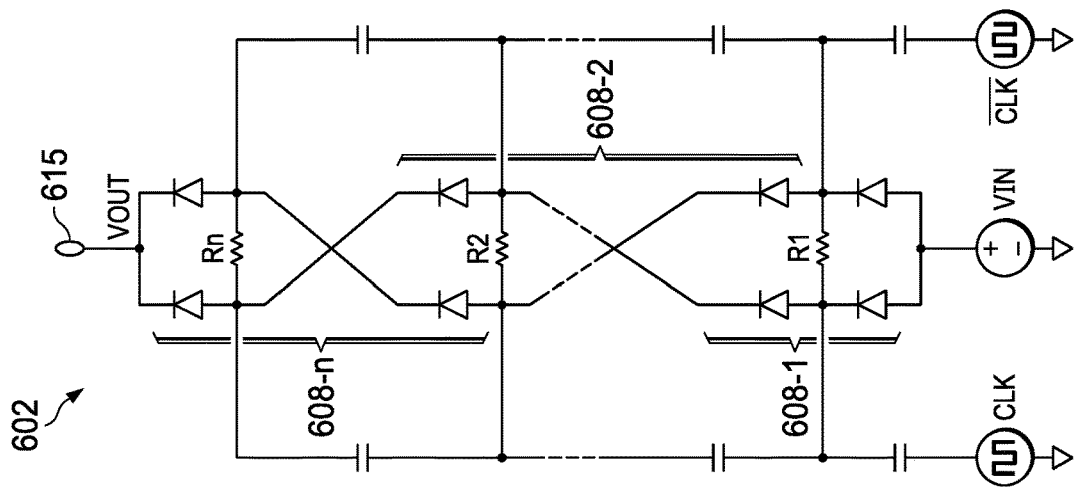
Figure 6A:
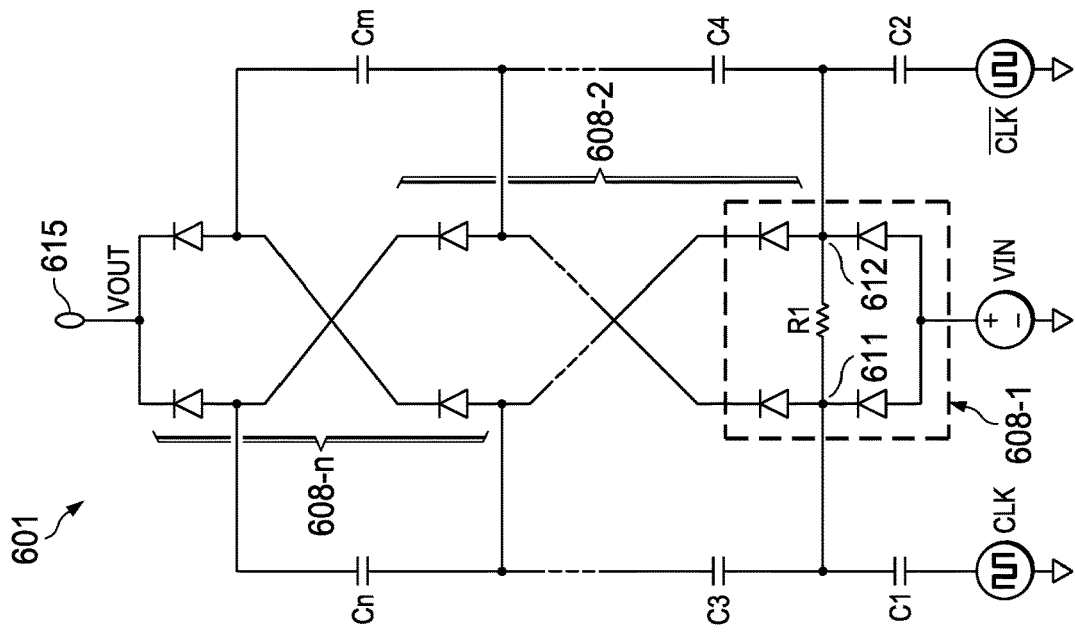

FIGS. 6A, 6B, 6C are schematics of example multi-stage half-wave interleaved series multiplier circuits 601, 602, 603 respectively that include charge recycling. FIG. 6A illustrates three or more stages with half-wave interleaved rectifier 608-1, and half-wave rectifiers 608-2, 608-n coupled together in an interleaved manner. Flying capacitors C1, C3, Cn are connected in series. Likewise, flying capacitors C2, C4, Cm are connected in series. In the example of FIG. 6A, charge recycle resistor R1 is coupled across rectifier 608-1 to the pulse terminals 611, 612. The approximate output voltage Vout on output terminal 615 if recycle resistor is not included is given by expression (8), where n is the number of stages and Vclk is the magnitude of the pulse signal CLK and CLK/. The approximate output voltage Vout on output terminal 615 when recycle resistor R1 is included is given by expression (9), assuming ideal diodes in the rectifiers.

In the example circuit 602 of FIG. 6B, which is similar to circuit 601 of FIG. 6A, recycle resistors R1, R2, Rn are coupled across each respective rectifier 608-1, 608-2, 608-n. However, the approximate output voltage Vout on output terminal 615 of circuit 502 is still approximately provided by expression (9).

In the example circuit 603 of FIG. 6C, which is similar to circuit 601 of FIG. 6A, recycle resistor R1 is coupled across only the last stage rectifier 608-n of circuit 603. However, in this configuration, the output voltage on terminal 615 is less than indicated by expression (9) but higher than indicated by expression (8).

Figure 7B:
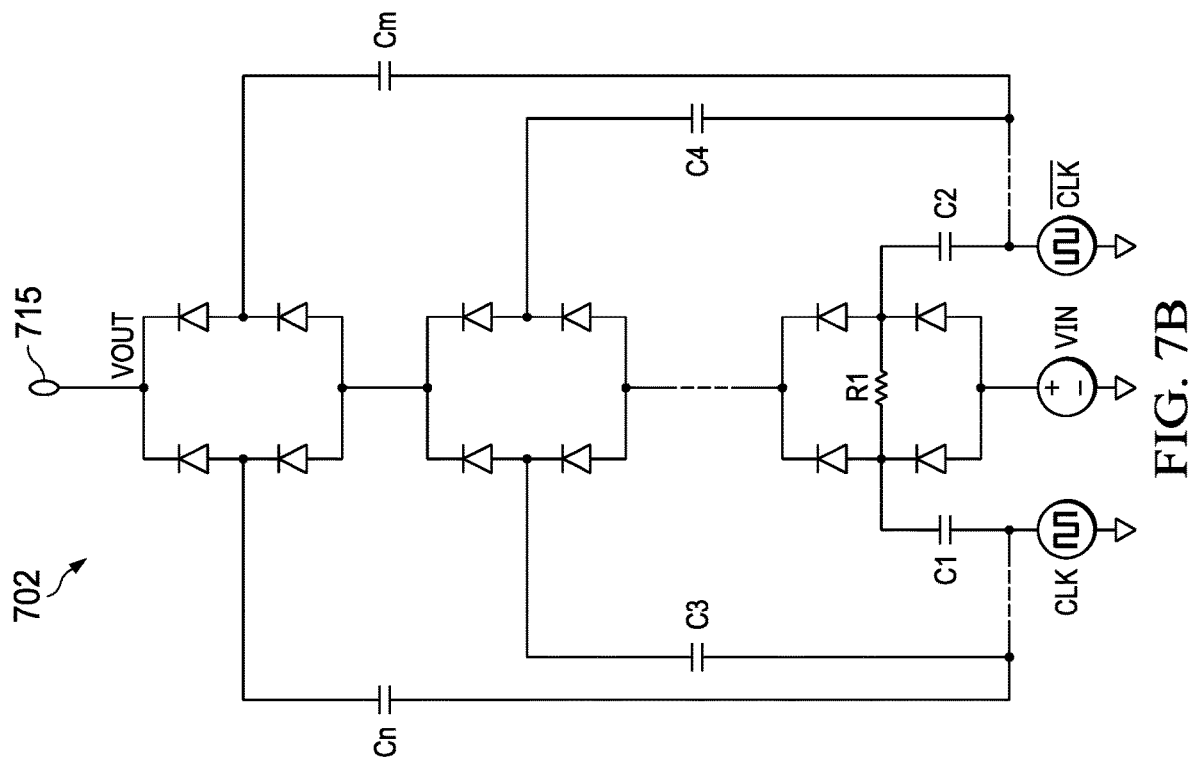
FIGS. 7A, 7B are schematics of example multi-stage full-wave parallel multiplier circuits that include charge recycling.
Figure 7A:
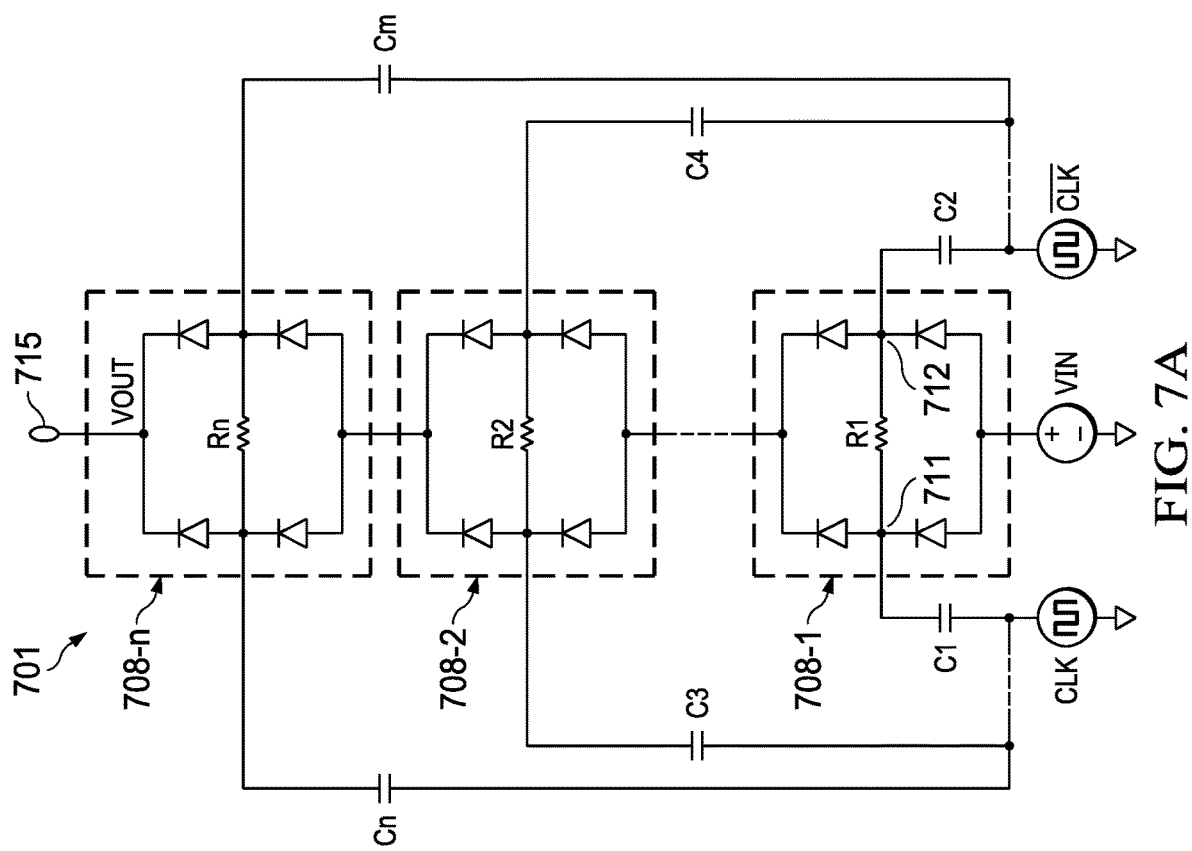

FIGS. 7A, 7B are schematics of example multi-stage full-wave parallel multiplier circuits 701, 702 respectively that include charge recycling. FIG. 7A illustrates three or more stages with full-wave bridge rectifiers 708-1, 708-2, 708-n. Flying capacitors C1, C3, Cn are connected in parallel. Likewise, flying capacitors C2, C4, Cm are connected in parallel. In the example of FIG. 7A, charge recycle resistor R1 is coupled across rectifier 708-1 to the pulse terminals 711, 712. Similarly, recycle resistors R2, Rn are coupled across each respective rectifier 708-2, 708-n. The approximate output voltage Vout on output terminal 715 if recycle resistors are not included is given by expression (8), where n is the number of stages and Vclk is the magnitude of the pulse signal CLK and CLK/. The approximate output voltage Vout on output terminal 715 when recycle resistor R1, R2, Rn are included is given by expression (9), assuming ideal diodes in the rectifiers.

In the example circuit 702 of FIG. 7B, which is similar to circuit 701 of FIG. 7A, recycle resistor R1 is coupled across only the first stage rectifier 708-n of circuit 702. However, in this configuration, the output voltage on terminal 715 is less than indicated by expression (9) but higher than indicated by expression (8). In this example parallel configuration, a recycle resistor is required on each parallel stage for full charge recycle voltage boosting benefit.

Figure 8B:
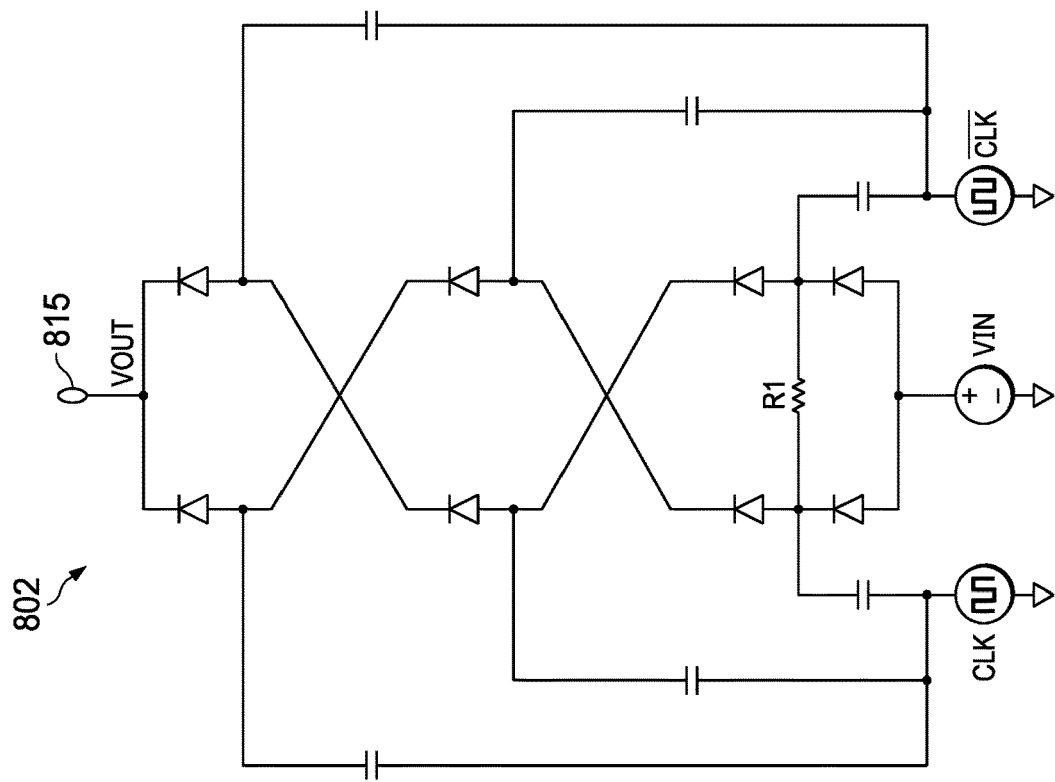
FIGS. 8A, 8B are schematics of example multi-stage half-wave parallel multiplier circuits.
Figure 8A:
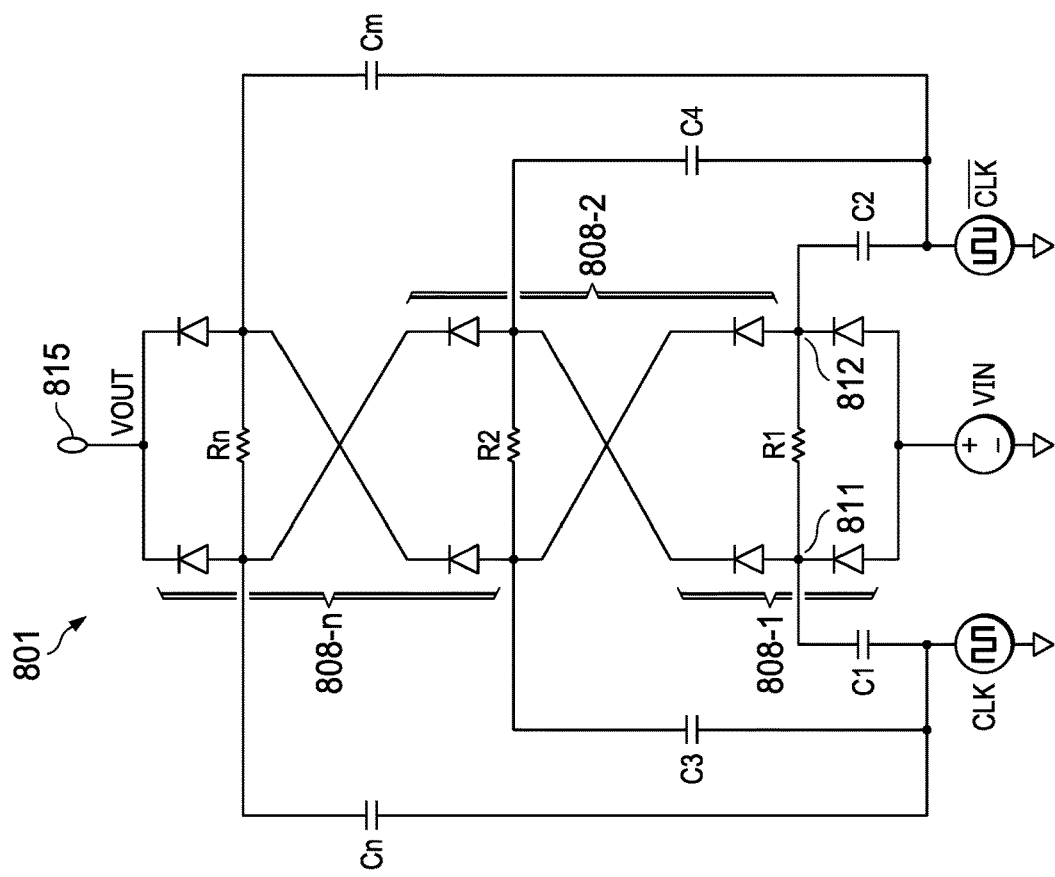

FIGS. 8A, 8B are schematics of example multi-stage half-wave parallel multiplier circuits 801, 802 respectively that include charge recycling. FIG. 8A illustrates three or more stages with half-wave interleaved rectifier 808-1 and half-wave rectifiers 808-2, 808-n coupled in an interleaved manner. Flying capacitors C1, C3, Cn are connected in parallel. Likewise, flying capacitors C2, C4, Cm are connected in parallel. In the example of FIG. 8A, charge recycle resistor R1 is coupled across rectifier 808-1 to the pulse terminals 811, 812. Similarly, recycle resistors R2, Rn are coupled across each respective rectifier 808-2, 808-n. The approximate output voltage Vout on output terminal 815 if recycle resistors are not included is given by expression (8), where n is the number of stages and Vclk is the magnitude of the pulse signal CLK and CLK/. The approximate output voltage Vout on output terminal 815 when recycle resistor R1, R2, Rn are included is given by expression (9), assuming ideal diodes in the rectifiers.

In the example circuit 802 of FIG. 8B, which is similar to circuit 801 of FIG. 8A, recycle resistor R1 is coupled across only the first stage rectifier 808-n of circuit 802. However, in this configuration, the output voltage on terminal 815 is less than indicated by expression (9) but higher than indicated by expression (8). In this example parallel configuration, a recycle resistor is required on each parallel stage for full charge recycle voltage boosting benefit.

Figure 9:
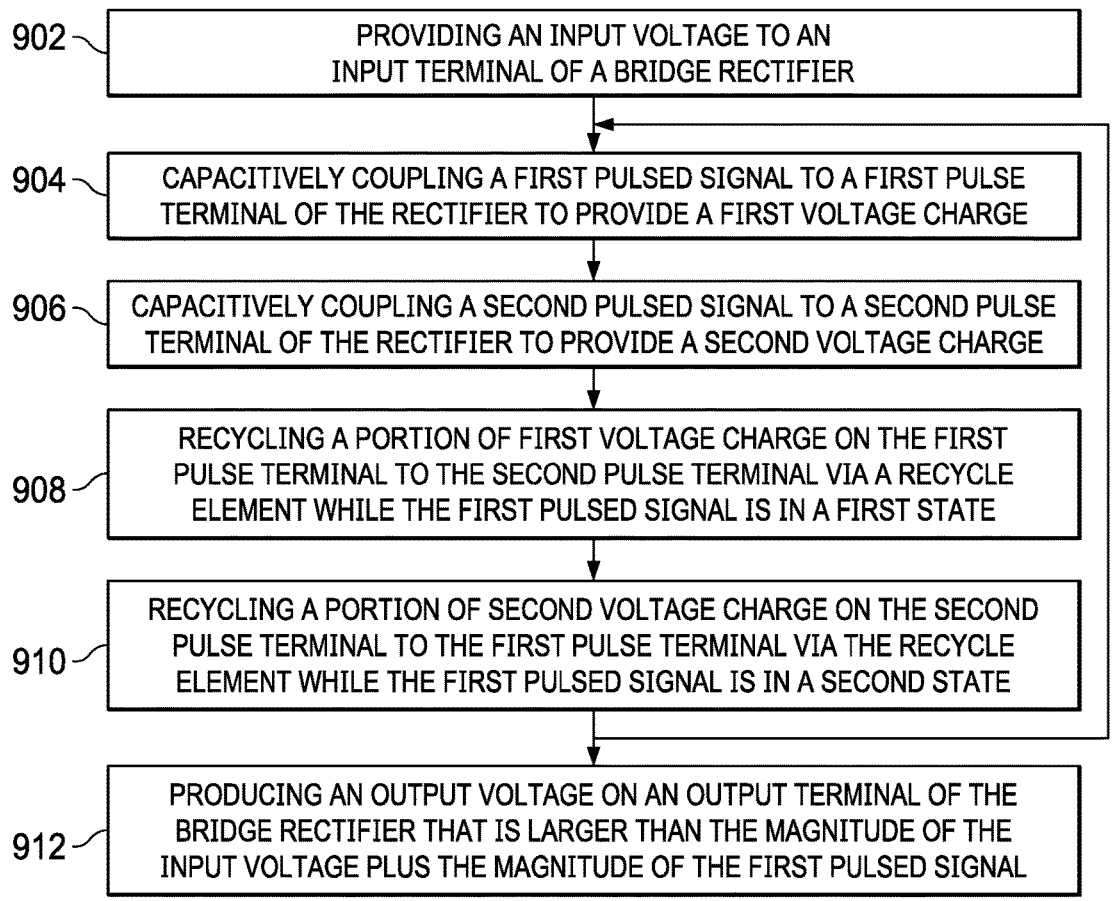
FIG. 9 is a flow diagram illustrating operation of an example switched capacitor circuit that has passive charge recycling.

FIG. 9 is a flow diagram illustrating operation of an example switched capacitor circuit that has passive charge recycling. FIG. 9 is representative of any of the example switched capacitor circuits having charge recycling described hereinabove, such as circuit 200 of FIG. 2.

At 902, a direct current (DC) input voltage is provided to an input terminal, such as DC input terminal 213 of FIG. 2, of a bridge rectifier to produce a first voltage on a first pulse terminal of the bridge rectifier and a second voltage on a second pulse terminal of the bridge rectifier, such as pulse terminals 211, 212 of FIG. 2.

At 904, a first pulsed signal is capacitively coupled to the first pulse terminal to provide a first voltage charge to boost the first voltage to a third voltage. For example, pulsed signal Vclk is coupled to flying capacitor C1, FIG. 2.

At 906, a second pulsed signal is capacitively coupled to the second pulse terminal to provide a second voltage charge to boost the second voltage to a fourth voltage, wherein the second pulsed signal is antiphase to the first pulsed signal. For example, pulsed signal Vclk/ is coupled to flying capacitor C2, FIG. 2.

At 908, a portion of the first voltage charge on the first pulse terminal is recycled to the second pulse terminal via a recycle element, such as recycle element R1 (FIG. 2), while the first pulsed signal is in a first state.

At 910, a portion of the second voltage charge on the second pulse terminal is recycled to the first pulse terminal via the recycle element while the first pulsed signal is in a second state.

At 912, an output voltage is produced on an output terminal of the bridge rectifier, such as output terminal 214 (FIG. 2), that is larger than the magnitude of the input voltage plus either the magnitude of the first pulsed signal or the magnitude of the second pulsed signal. For a circuit with ideal diodes, the output voltage has an approximate magnitude indicated by expression (3).

In this manner, a passive method of charge recycling provides up to a factor of two voltage multiplication using only a single recycle resistor coupled across a rectifier circuit. This saves area and cost over simply adding an additional stage to a typical charge pump. This technique simply adds a single recycle resistor and no additional active circuitry in place of extra drivers, capacitors, etc. Additional rectifier stages can be added to further boost the output voltage magnitude.

System Example

Figure 10:
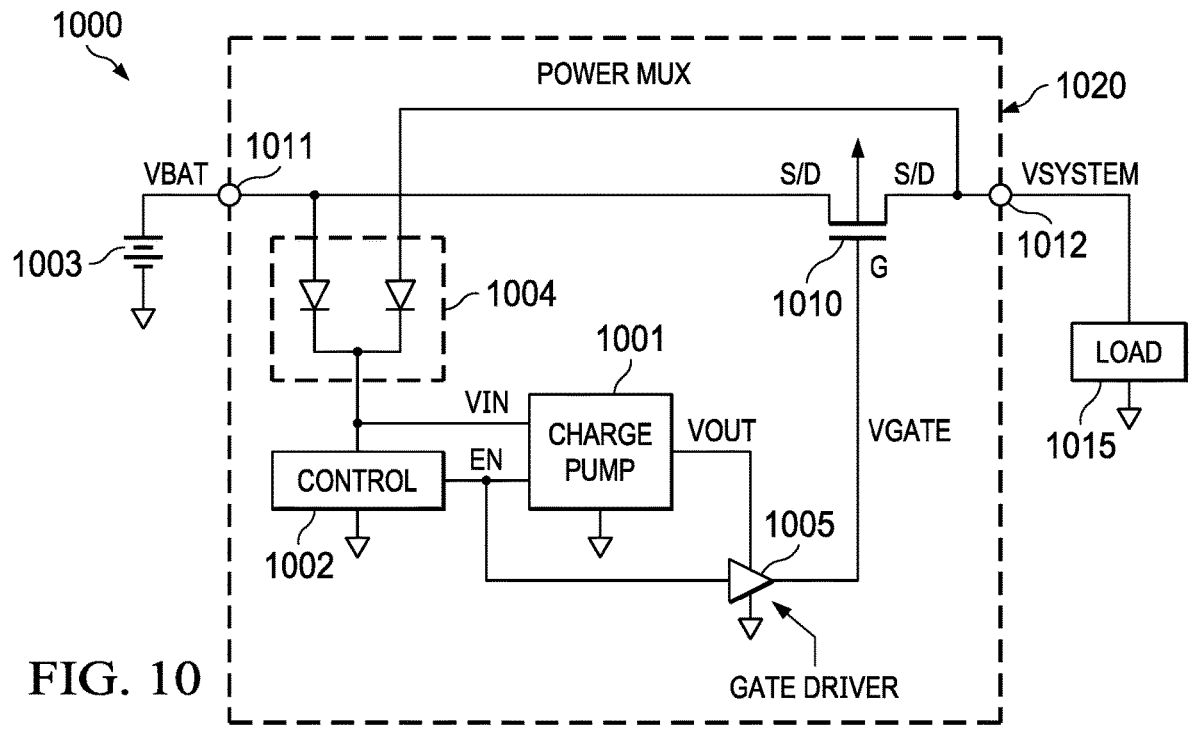
FIG. 10 is a block diagram illustrating an example system that includes an example switched capacitor circuit that has passive charge recycling.

FIG. 10 is a block diagram illustrating an example system 1000 that includes an example switched capacitor charge pump 1001 that has passive charge recycling. A battery 1003 is coupled to battery input terminal 1011. In this example, batter switch circuit 1020 isolates the battery terminal 1011 from a supply terminal 1012 of a system voltage rail (Vsystem) that is used to power a load module 1015. Load module 1015 is a functional circuit or device that may be designed to perform a particular function that needs to be selectively connected or disconnected from battery 1003. In some examples, system 1000 includes decoupling/filter capacitance on the system voltage rail Vsystem.

In this example, an NMOS power transistor 1010 within battery switch circuit 1020 functions as a switch. In order to operate the NMOS transistor 1010 in triode mode as a switch, the gate voltage (Vgate) provided to the gate terminal (G) must rise above the battery voltage Vbat provided to a source/drain terminal (S/D) by at least a threshold voltage of the NMOS device 1010. The on-resistance of NMOS device 1010 is reduced further the higher Vgate is reliably driven.

In this example, power/voltage is provided to charge pump 1001 from V_BAT or V_SYSTEM, whichever is higher, using a power mux 1004 to produce Vin. Power mux 1004 may also be referred to as an analog-OR circuit. In this example, power mux 1004 is implemented with two diodes. In another example, other known or later developed mux techniques may be used.

Control logic 1002 is powered by Vin and produces an enable signal (EN). Control logic 1002 decides when to enable the charge pump and the gate driver given some criteria, such as: battery temperature in range, battery not depleted/overcharged, etc.

The charge pump circuit 1001 is used to create a voltage Vout that is greater than the battery voltage. Vout is a supply for the gate driver 1005, which produce Vgate when enabled by signal EN from control logic 1002. Signal Vgate drives the gate of the NMOS switch 1010 to a voltage sufficient to produce a low-resistance switch between Vbat and Vsystem. Charge pump circuit 1001 is similar to charge pump 200 illustrated in FIG. 2. Charge pump circuit 1001 includes charge recycling in order to boost Vgate reliably to a value provided by expression (3). In another example, a charge pump similar to any of charge pumps 501, 502, 503, 601, 602, 603, 701, 702, 801, 802 may be used to boost gate voltage Vgate even high.

In this example, gate driver 1005 includes some additional features, such as current limit and soft-start to ensure the NMOS switch 1010 and battery are gradually transitioned from off to on.

In some examples, the system 1000 is fabricated on a semiconductor wafer using known or later developed semiconductor fabrication techniques to form an integrated circuit (IC) die. In some examples, functional module 1015 is included in a same IC die as battery switch circuit 1020, while in other examples they may be fabricated on different IC die. In some examples, each IC die is packaged using known or later developed IC packaging techniques and later mounted on a printed circuit board. In other examples, a bare die may be mounted on a printed circuit board or other electronic substrate.

Other Embodiments

In described examples, a single rectifier stage is used as a charge pump to increase a DC voltage level. A passive recycle element, such as a resistor, is coupled across the rectifier and further increases an output DC voltage level.

In other examples, multiple rectifier stages may be daisy chained to further increase the output DC voltage level. In some examples a recycle element may be included with each of the multiple rectifier stages. In other examples, a recycle element may be provided for at least one, but not all, of the multiple rectifier stages.

In some examples, the recycle element is a simple resistor, implemented using polysilicon, a biased MOSFET device, doped semiconductor material, or other known or later developed techniques. In other examples, the recycle element may be an actively controlled switch, with which control logic is provided to turn the switch off and on at appropriated time to produce charge recycling across a rectifier stage.

In some examples, a simple capacitor filter is provided at the output of the one or more rectifier stages. In another example, multiple filter stages may be provided. In another example, an inductive stage may be combined with one or more rectifier stages with charge recycling to further boost a DC output voltage.

In described examples, the magnitude of the pulse signals is approximately equal to the magnitude of the DC input voltage. In another example, the magnitude of the pulse signals may be either higher or lower than the magnitude of the DC input voltage. In some examples, the magnitude of the inverted pulse signal may be different from the magnitude of the non-inverted pulse signal. A resultant DC output voltage will be scaled accordingly.

In this description, the term "couple" and derivatives thereof mean an indirect, direct, optical, and/or wireless electrical connection. Thus, if a first device couples to a second device, that connection may be through a direct electrical connection or through an indirect electrical connection via other devices and connections.

Modifications are possible in the described embodiments, and other embodiments are possible, within the scope of the claims.

What is claimed is:

1. An apparatus comprising:
a diode bridge circuit including:
a first diode having a first anode and a first cathode, the first anode coupled to a voltage input;
a second diode having a second anode and a second cathode, the second anode coupled to the first cathode, and the second cathode coupled to a voltage output;
a third diode having a third anode and a third cathode, the third anode coupled to the voltage input; and
a fourth diode having a fourth anode and a fourth cathode, the fourth anode coupled to the third cathode, and the fourth cathode coupled to the voltage output;
a first capacitor coupled between a first signal input and the first cathode;
a second capacitor coupled between a second signal input and the third cathode, the first and second signal inputs having opposite polarities; and
a resistor coupled between the first and third cathodes.

2. The apparatus of claim 1, further comprising:
a signal source having first and second signal outputs, the first signal output coupled to the first signal input, the second signal output coupled to the second signal input, and the signal source configured to provide first and second pulsed signals at the respective first and second signal outputs, the first and second pulsed signals having opposite polarities.

3. The apparatus of claim 1, further comprising:
a signal source having a signal output coupled to the voltage input, the signal source configured to provide a direct current (DC) voltage at the signal output; and
a third capacitor coupled to the voltage output.

4. The apparatus of claim 1, further comprising a third capacitor coupled between the voltage input and the second cathode.

5. The apparatus of claim 1, wherein the diode bridge circuit is a first diode bridge circuit, and the apparatus further comprises a second diode bridge circuit including:
a fifth diode having a fifth anode and a fifth cathode, the fifth anode coupled to the fourth cathode;
a sixth diode having a sixth anode and a sixth cathode, the sixth anode coupled to the fifth cathode, and the sixth anode coupled to the voltage output;
a seventh diode having a seventh anode and a seventh cathode, the seventh anode coupled to the second cathode; and
an eighth diode having an eighth anode and an eighth cathode, the eighth anode coupled to the seventh cathode, and the eighth anode coupled to the voltage output.

6. The apparatus of claim 5, wherein the resistor is a first resistor, and the apparatus further comprises a second resistor between the fifth and seventh anodes.

7. The apparatus of claim 1, wherein the resistor includes at least one of: a polysilicon resistor, a diffused region of a transistor, or a biased transistor.

8. The apparatus of claim 1, wherein the diode bridge circuit is a first diode bridge circuit, and the apparatus further comprises:
a second diode bridge circuit including:
a fifth diode having a fifth anode and a fifth cathode, the fifth anode coupled to the second and fourth cathodes;
a sixth diode having a sixth anode and a sixth cathode, the sixth anode coupled to the fifth cathode, and the sixth cathode coupled to the voltage output;

a seventh diode having a seventh anode and a seventh cathode, the seventh anode coupled to the second and fourth cathodes; and an eighth diode having an eighth anode and an eighth cathode, the eighth anode coupled to the seventh cathode, and the eighth cathode coupled to the voltage output;

a third capacitor coupled between the fifth cathode and the first signal input; and a fourth capacitor coupled between the seventh cathode and the second signal input.

9. The apparatus of claim 8, wherein the third capacitor is coupled between the fifth cathode and the first capacitor, and the fourth capacitor is coupled between the seventh cathode and the second capacitor.

10. The apparatus of claim 9, wherein the resistor is a first resistor, and the apparatus further comprises a second resistor coupled between the fifth and seventh cathodes.

11. The apparatus of claim 10, further comprising a fifth capacitor coupled between the fifth anode and the sixth cathode.

12. The apparatus of claim 5, further comprising:
a third capacitor coupled between the fifth cathode and the first signal input;
a fourth capacitor coupled between the seventh cathode and the second signal input;
a fifth capacitor coupled between the fifth cathode and the eighth cathode; and
a sixth capacitor coupled between the seventh cathode and the sixth cathode.

13. The apparatus of claim 12, wherein:
the third capacitor is coupled between the fifth cathode and the second cathode; and
the fourth capacitor is coupled between the seventh cathode and the fourth cathode.

14. A method comprising:
providing a first voltage to a first anode of a first diode and a second anode of a second diode, in which the first diode has a first cathode coupled to a third anode of a third diode and a first plate of a first capacitor, and the second diode has a second cathode coupled to a fourth anode of a fourth diode and a first plate of a second capacitor;
providing a first pulsed signal to a second plate of the first capacitor, in which the first pulsed signal causes the first plate of the first capacitor to be charged to a second voltage based on the first voltage and then causes the first plate of the first capacitor to discharge via a resistor coupled between the third and fourth anodes;
providing a second pulsed signal to a second plate of the second capacitor, in which the second pulsed signal causes the first plate of the second capacitor to charge to a third voltage based on the first voltage and then causes the first plate of the second capacitor to discharge via the resistor; and
providing a fourth voltage based on the second and third voltages at a third cathode of the third diode and a fourth cathode of the fourth diode.

15. The method of claim 14, further comprising:
providing the fourth voltage to a fifth anode of a fifth diode and a sixth anode of a sixth diode, in which the fifth diode has a fifth cathode coupled to a seventh anode of a seventh diode and a first plate of a third capacitor, and the sixth diode has a sixth cathode coupled to an eighth anode of an eighth diode and a first plate of a fourth capacitor;
providing the first pulsed signal to a second plate of the third capacitor, in which the first pulsed signal causes the first plate of the first capacitor to be charged to a fifth voltage based on the fourth voltage;
providing the second pulsed signal to a second plate of the fourth capacitor, in which the second pulsed signal causes the first plate of the fourth capacitor to be charged to a sixth voltage based on the fourth voltage; and
providing a seventh voltage based on the fifth and sixth voltages at a seventh cathode of the seventh diode and an eighth cathode of the eighth diode.

16. The method of claim 15, wherein providing the first pulsed signal to the second plate of the third capacitor comprises providing the first pulsed signal via the first capacitor; and
wherein providing the second pulsed signal to the second plate of the fourth capacitor comprises providing the second pulsed signal via the second capacitor.

17. The method of claim 15, wherein the resistor is a first resistor;
wherein the first pulsed signal causes the first plate of the third capacitor to be discharged via a second resistor coupled between the fifth and sixth cathodes; and
wherein the second pulsed signal causes the first plate of the fourth capacitor to be discharged via the second resistor.

18. A system comprising:
a transistor having a control terminal and first and second current terminals;
a diode bridge circuit including:
a first diode having a first anode and a first cathode, the first anode coupled to the first current terminal;
a second diode having a second anode and a second cathode, the second anode coupled to the first cathode, and the second cathode coupled to the control terminal;
a third diode having a third anode and a third cathode, the third anode coupled to the first current terminal; and
a fourth diode having a fourth anode and a fourth cathode, the fourth anode coupled to the third cathode, and the fourth cathode coupled to the control terminal;
a first capacitor coupled between a first signal input and the first cathode;
a second capacitor coupled between a second signal input and the third cathode, the first and second signal inputs having opposite polarities; and
a resistor coupled between the first and third cathodes.

19. The system of claim 18, further comprising a signal source having first and second signal outputs, the first signal output coupled to the first signal input, the second signal output coupled to the second signal input, and the signal source configured to provide first and second pulsed signals at the respective first and second signal outputs, the first and second pulsed signals having opposite polarities.

20. The system of claim 18, further comprising a multiplexor circuit having first and second input and an output, the first input coupled to the first current terminal, the second input coupled to the second current terminal, and the output coupled to the first and third anodes.

* * * * *